April 30, 1963    M. J. P. BOGART    3,087,797
REGENERATIVE FURNACE
Original Filed July 16, 1956
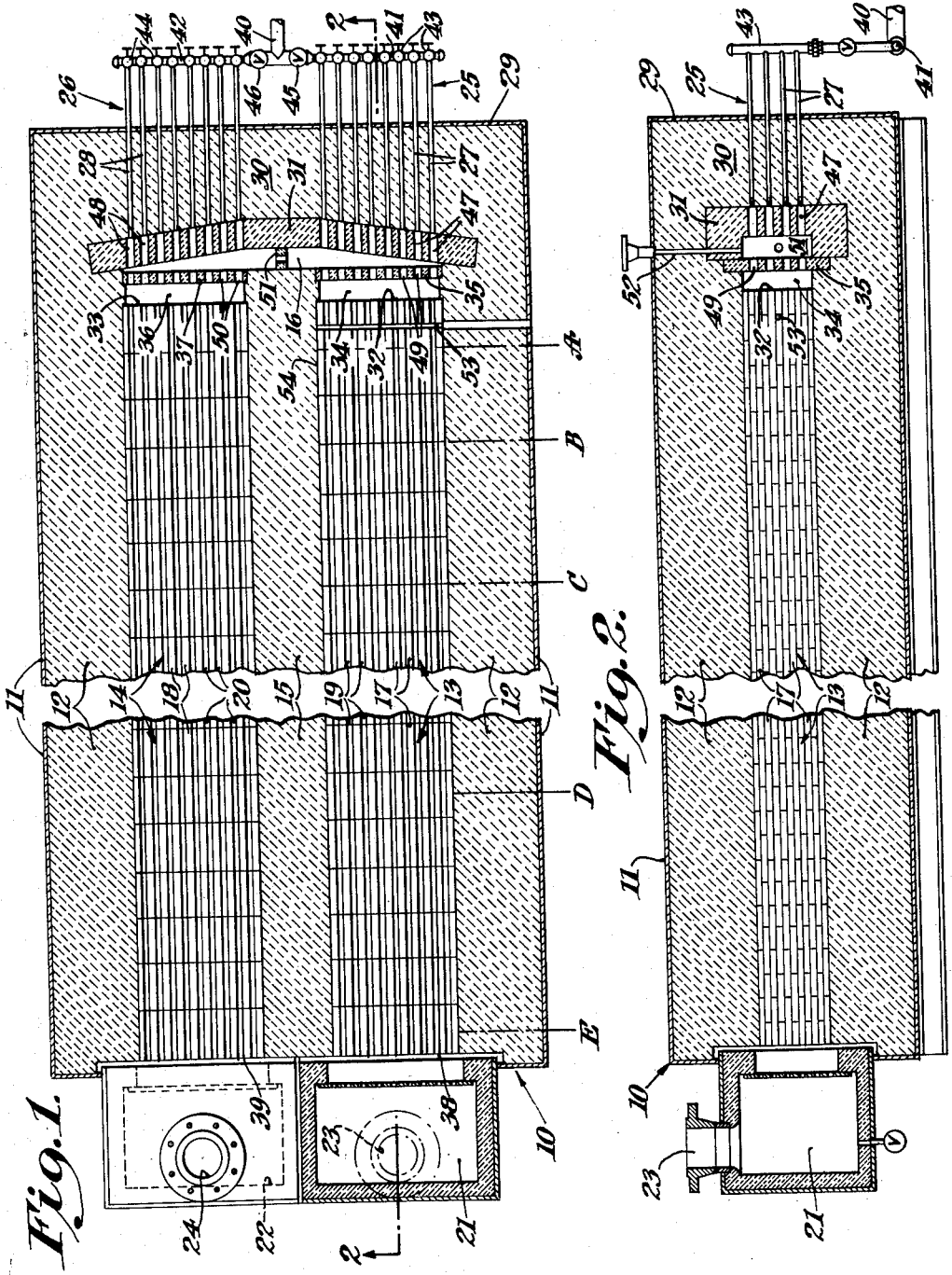
INVENTOR
Marcel J.P. Bogart
BY
AGENT United States Patent Office 3,087,797
Patented Apr. 30, 1963

1

3,087,797
REGENERATIVE FURNACE
Marcel J. P. Bogart, Stamford, Conn., assignor to The Lummus Company, New York, N.Y., a corporation of Delaware
Continuation of application Ser. No. 598,091, July 16, 1956. This application Apr. 24, 1961, Ser. No. 112,161
2 Claims. (Cl. 23—277)

This invention relates to regenerative furnaces for carrying out processes for endothermically altering gaseous reactants and more particularly to combustion apparatus for such furnaces.

Regenerative furnaces are often designed to conduct reactions in which gases are heated to high temperatures for the purpose of producing desirable end products and then cooled to arrest further reaction. When such reactions are endothermic, energy in the form of heat must be supplied to maintain the reaction. This may be conveniently done by exothermic combustion of fuel with normal or enriched air or oxygen in the reaction apparatus. In order to prevent undesirable dilution of the reaction products by combustion gases of the exothermic reheating reaction, the endothermic and exothermic steps are carried out separately and alternately in the same apparatus. Due to the rapidity with which high temperature chemical reactions take place, it is sometimes necessary to impose a further restriction on the apparatus that the reacting gases to rapidly brought to reaction temperatures and then rapidly cooled to prevent degradation of the desired end product by its own reactivity at the high temeprature at which it is formed.

As an example, the production of acetylene by the pyrolysis of hydrocarbons, such as methane, may be carried out in a regenerative furnace type of reactor in which the reacting gases are heated to temperatures as high as 1400° C. At these high temperatures, the acetylene product formed is unstable and will decompose unless quickly cooled, causing a consequent loss in yield. It is therefore necessary for high production yields to design the reaction apparatus so that reaction gases have a minimum residence time at the high temperatures and, at the same time, it is necessary to maintain a high heat input rate during the alternate exothermic reheating step. The aims of low reaction residence time and high heat input rates are in direct conflict as the former requires small apparatus volume and the latter requires large apparatus volume, particularly in the combustion zone.

It is well known that reactions of this type can be conducted by passing reactive gases through a refractory mass which has been heated to a temperature above that required for the reaction. The endothermic reaction heat is supplied to the flowing reactive gases, as well as the heat required to bring them to reaction temperature, by removal of heat from the heated refractory mass with a consequent lowering of the temperature of the refractory mass. It is also well known that the heat removed from such a refractory mass can be restored thereto by such means as the combustion of fuel with consequent increase in the temperature of the mass. To prevent mixing of the gases of the endothermic reaction and the gases from the combustion step, the apparatus is alternately operated, first on the combustion part of the cycle and then on the reaction part of the cycle. The cooling and quenching of the desired reacted gases can also be conveniently accomplished by the rapid surrendering of their heat content to a second refractory mass maintained at a temperature lower than that of the products of the endothermic reaction. The second mass may be alternately air-cooled prior to entry of the reacted gases

2 to be cooled. It is obvious that the air used to cool the second mass is preheated and may therefore be advantageously used in the combustion part of the cycle to increase overall thermal efficiency. The combination of these steps and requirements then results in a so-called regenerative furnace comprised of two refractory masses with means for introducing fuel for combustion between said masses. The regenerative furnace is operated on an alternating and recurrent two-part cycle which may appropriately be designated as a "heat-and-make cycle," as follows:

Part 1: Preheating air by flowing it through a first refractory mass, injecting fuel into said preheated air, and heating a second refractory mass by the resulting products of combustion;

Part 2: Carrying out an endothermic reaction and quenching the products of such reaction in which heat is supplied to the gases to be reacted by passing them through the hot second refractory mass in opposite direction to the products of combustion of the preceding part of the cycle and then through the first refractory mass in opposite direction to the air flowing therethrough during the preceding part of the cycle, which quenches the reacted gases by transferring heat from said gases to the first refractory mass.

By suitable control means, an exact balance may be maintained in the above two-part cycle between the heat removed from the refractory masses during endothermic reaction and the heat restored to such masses by the combustion reaction. More uniform temperature conditions in the regenerative furnace can, however, be maintained by using a four-part cycle in which tendencies for temperature drifts through the mass are eliminated by self compensation due to the complete symmetry of an alternating and recurrent four-part cycle. The four-part cycle may also be designated as a "heat-and-make cycle" and for a dual refractory mass furnace, with means for introducing fuel for combustion between said masses, includes:

Part 1: Heating the first mass in one direction;
Part 2: Making a reaction product in the first mass in the opposite direction;
Part 3: Heating the second mass in one direction;
Part 4: Making a reaction product in the second mass in the opposite direction.

The four-part cycle, however, has the disadvantage over the two-part cycle in that the temperature at any point in the mass rises or falls in two steps. Therefore, all other factors being unchanged, the range of the temperature variation in the four-part cycle will be about twice that of the simpler two-part alternation from cooling to heating to cooling.

In prior art regenerative furnaces, such as disclosed in British Patent No. 716,814, it has been observed by traverse measurement in the hottest zone of the furnace that during endothermic reaction a substantial temperature gradient exists across each mass at planes normal to the direction of flow of gases within the mass. Such gradients are undesirable because of the major effect of temperature on reaction rates for high temperature endothermic reactions. For example, the cracking rate of some petroleum fraction doubles with each 25° F. increase in temperature. Further, endothermic reactions generally produce more than one product from a given feed material. In addition to the desired product less desirable or unwanted by-products are formed as a result of further reactions involving the feed material or intermediate products.

It is known that in such cases optimum yields of the desired product will be obtained over a very narrow temperature range, wherein the undesired side reactions are suppressed to the maximum degree. This then necessitates apparatus and operation wherein the reacting material is subjected to a minimum temperature gradient at any station in the apparatus, that is, no substantial difference in temperature in any plane normal to the flow of such material. This will ensure that any particle of feed material to be endothermically altered will undergo the same optimum reaction conditions as any other particle.

The present invention provides a process and apparatus wherein a uniform longitudinal temperature gradient ranging from inlet temperatures to reaction temperatures is constantly maintained along the length of each regenerative mass and wherein a minimum temperature gradient exists across each mass at any plane normal to the direction of flow of gases within the masses. If a substantial temperature gradient exists across the mass normal to the direction of flow of the gases therein, as in prior art processes, heating and the degree of reaction is uneven and thermally inefficient with resulting lower product yields and undesirable side reactions.

The present invention provides a highly efficient, economical and versatile regenerative endothermic alteration process and/or apparatus of the type described above for conducting various endothermic reactions wherein heat is alternately stored and released by the furnace masses at high rates and under uniform conditions.

The present invention further provides such a process and/or apparatus as above for improved endothermic vapor phase production of various alteration products from starting materials including: the production of heating gas from hydrocarbons, such as natural gas; low molecular weight hydrocarbons from heavier hydrocarbons; dehydrogenation products, such as acetylene, ethylene and other olefins from dehydrogenatable saturated hydrocarbons; aromatic hydrocarbons such as benzene from other hydrocarbons; isomerization products from hydrocarbons; hydrogen cyanide from hydrocarbons and ammonia; dehydration products from alcohols; hydrogen from hydrocarbons; and carbon black from hydrocarbons.

It is, therefore an object of the invention to provide a furnace and combustion apparatus for producing an off-gas containing a substantial portion of desired reaction products.

It is a further object of the invention to provide a new and useful furnace and combustion apparatus which may be used to produce an off-gas containing a substantial proportion of acetylene and/or ethylene from an in-gas consisting of or containing a substantial portion of a suitable feed hydrocarbon.

It is a still further object of the invention to provide combustion apparatus for heating regenerative furnace masses wherein the temperature across the furnace at any plane normal to the direction of flow of gases within the masses is substantially uniform throughout the length of the furnace.

Other objects of the invention will be apparent from the accompanying drawing and the following description of the features of the invention and in the provision of apparatus and methods of operation for accomplishing the foregoing objects.

In the drawing,

FIG. 1 represent a horizontal section of an embodiment of the apparatus of the present invention; and FIG. 2 represents a side elevation of the furnace of FIG. 1 in cross section through line 2—2 of FIG. 1.

The furnace 10 as illustrated in the drawing consists of a shell 11 preferably formed of steel and having a heat insulating lining 12. Placed inside the lining are two regenerative masses 13 and 14. These masses as shown are disposed in side by side relationship and are separated by heat insulating wall 15. Such masses may be disposed in any other manner, for example, perpendicular to each other at their combustion end. The masses 13 and 14 are joined at one end by a chamber or combustion space 16. Each of the masses is comprised of suitable refractory elements having the property of permitting the flow of gas therethrough and the capability of storing and releasing the heat quantities involved in the process conducted in the furnace. FIGS. 1 and 2 illustrate the use of regular shaped tiles 17 and 18 as refractory packing for regenerative masses 13 and 14, which, as shown, have conduits 19 and 20 for passage of gases through the apparatus.

Plenum chambers 21 and 22 and piping connections 23 and 24 are provided for introduction and withdrawal of gases to and from the ends of the regenerative masses opposite to the combustion space. Chamber 16 is provided with fuel injecting means 25 and 26 which may comprise channels 27 and 28, respectively, for gaseous or liquid fuel. These channels project through end wall 29 and the end refractory liner 30 with the injection means 27 firing through holes in refractory liner 31 toward the end 32 of regenerative mass 13 and the injection means 28 firing through liner 31 toward the end 33 of regenerative mass 14. The conduits 19 of mass 13 are connected through chamber 34 and the flues of baffle 35 to chamber 16, while the flues of mass 14 are connected through chamber 36, and the flues of baffle 37 to chamber 16.

In carrying out any endothermic alteration process wherein the reactants must be heated, reacted, and quenched, the operation of the furnace is cyclic and in brief, consists of an endothermic reaction step and a heating step in one direction followed by an endothermic reaction step and heating step in the reverse direction for a four-part cycle. The time of these steps may be varied according to needs.

Initially assuming mass 13 to be heated and mass 14 to be cooled, a description of the complete cycle follows:

(a) A gas to be reacted is introduced at the front end 38 of mass 13 and flows therethrough, pyrolysis occurs and reacted gas is withdrawn from the back end 32 of said mass and passed through baffle 35, chamber 16 and baffle 37 to end 33 of mass 14 wherein during flow to end 39 of said mass it is quenched below a temperature at which no further reaction occurs.

(b) Air is next introduced at the front end 38 of the mass 13 and is preheated by the removal of heat from said mass before reaching combustion space 16. Fuel gas is admitted to the combustion zone through injectors 27 and hot gases pass through baffle 37 and heat the refractory mass 14 in passing through and out of the front end 39 of said mass.

(c) The preceding pyrolysis step (a) is repeated, with flow of gases in the opposite directions, that is, gas to be reacted is introduced at end 39 of mass 14 and quenched reacted gas withdrawn from end 38 of mass 13.

(d) The preceding combustion step (b) is repeated, with flow of air and flue gases in the opposite direction, that is, air is introduced at end 39 of mass 14 and cooled products of combustion withdrawn from end 38 of mass 13.

When the furnace of my invention is operated efficiently in accordance with the above outlined regenerative process cycle it is obvious that prior to high temperature reaction in either refractory mass 13 or 14 such mass must be quickly heated to high temperatures. To accomplish the required rapid high temperature heating, hot combustion gases give up heat to regenerative mass 13 or 14. During the burning of heating fuel and heating of a regenerative mass it is important that no carbon be deposited on the walls of the conduits or channels 19 and 20 which would result in clogging of the flues and a decrease in throughput. It is therefore important for this reason and for economy and efficiency of fuel utilization that the combustion of the heating fuel be as complete as possible.

The novel fuel injection arrangement of my invention provides substantially complete and intimate mixing of fuel and combustion supporting gases followed by complete combustion thereof in a minimum of combustion space with the result that the regenerative mass to be reheated is quickly restored to a condition to provide a high temperature heat source in which there is a nearly uniform temperature across the mass normal to the flow of gases therein. The nearly uniform temperatures available at any point in any such transverse cross section of the mass results in a substantially increased yield of desired reaction products over prior art arrangements which have resulted in hot spots in the mass.

As shown in FIGURES 1 and 2, two groups of injectors 27 and 28 project through end casing 29 of furnace 10, and refractory line 30. Fuel is supplied to the injectors through supply line 40, headers 41 or 42 and lines 43 or 44 as directed by valves 45 and 46. Fuel is ejected from each of the injectors 27 or 28 through openings 47 or 48, respectively, in refractory liner 31 and across the combustion chamber 16 and is preferably directed through openings 49 or 50 in mixing baffles 35 or 37, respectively. Each of the injectors may operate at near sonic velocity so that the fuel will remain in a high velocity stream at least until it has approached openings 49 or 50 in baffle 35 or 37. Alternatively, openings 47 and 48 in the refractory liner 31 may constitute the injection means with injectors 27 and 28 withdrawn to a point nearer end casing 29 of furnace 10.

Air for combustion passes through either mass 13 or 14 and is preheated as it approaches chamber 34 or 36 and usually enters said chambers at a much lower velocity than the fuel exiting from openings 47 and 48.

As fuel in a plurality of streams approaches either chamber 34 or 36, it penetrates the air flow from such chambers and intimately mixes with the streams of preheated air. The mixture of preheated air and fuel ignites and combustion continues as the mixture passes through chamber 16. The hot combustion reactants and/or products are further mixed as they pass through baffle 35 or 37 prior to entry into the regenerative mass 13 or 14 respectively, to be heated. Further mixing of the combustion reactants can be obtained by providing an intermediate mixing baffle 51. For initial ignition purposes a pilot burner 52 may be provided in chamber 16.

Specifically, in the operation where mass 14 is to be heated, fuel is ejected from injectors 27 toward chamber 34 and is mixed with preheated air from mass 13. The air-fuel mixture is ignited with the resulting hot combustion gases flowing toward mixing baffle 37. The hot mixed combustion gases passing through baffle 37 are uniformly distributed into conduits 20 of mass 14 giving up their heat to said mass as they flow therein toward chamber 22. Relatively cool combustion gases are removed from chamber 22 through outlet 24.

Subsequent to the heating of mass 14, feed gases to be converted are passed through such mass from end 39 to chamber 36. Gases leaving mass 14 pass through baffles 37 and 35 and are then quickly cooled to below the reaction temperature by contact with the relatively cool mass 13, from which they exit at end 38. The heating, cracking and quenching recurrent cycle is repeated alternately from mass 13 to mass 14.

Where an endothermic alteration reaction based upon two-part cycle operation is to be carried out in the apparatus of my invention, only one set of fuel injectors is required, depending upon the single flow direction chosen for the feed material being reacted, the flow of gases in the heating step being in the other and reverse direction. Where reheating occurs by flowing hot combustion gases through mass 13, only injectors 28 are necessary whereas when reheating occurs by flowing hot combustion gases through mass 14, only injectors 27 are used.

As a result of the intimate mixing of air and fuel in the combustion zone maximum rates of heat liberation may be obtained in a minimum of space and as a result of the mixing and even distribution of combustion gases into the mass to be heated, my combustion apparatus provides extremely uniform heat distribution across the face of the mass being heated and at all other parallel planes in said mass, with a resultant subsequent uniform and optimum conversion of gases to be reacted with maximum yields of desirable products. When heating refractory masses of the character described I have found that for high temperature heating, in the neighborhood of 1000° C. and above, there occurs across the face of the mass a temperature gradient of only ±25° C. or less and that such minimum temperature differential has not heretofore been obtainable by known combustion systems in high temperature regenerative furnaces.

The following example illustrates the operational advantages of my combustion system in connection with a regenerative furnace operated under test. The data tabulated below was obtained from a pyrolysis furnace of substantially the same design as the furnace illustrated in FIGURES 1 and 2 of the drawing.

EXAMPLE

Furnace dimensions (each mass):
  Length _____ inches__ 108
  Width _____ do____ 18
  Height _____ do____ 10
Furnace flues:
  Number _____ per mass__ 384
  Diameter _____ inches__ ⅜
Injectors: Number _____ per mass__ 32

After continuous cyclic heating and cracking operation of the above described furnace at temperatures averaging 800° C. a temperature probe was positioned within hole 53 in mass 13, such hole being centrally located vertically in the mass 3⅜ inches downstream of mass face 32, and communicating with conduits 19. Temperatures of the gas flow through the conduits 19 were continuously measured and recorded for the entire cycle of operation with the probe being shifted across the mass to a new point after each full cycle. The time of each full cycle was approximately four minutes. The initial point of temperature measurement was two inches from wall 54 of mass 15 with subsequent measurements being taken at points 4, 6, 9, 12, 14 and 16 inches from such wall. During the cracking phase of the cycle, temperatures were recorded as indicated in the following table:

Table 1

| Inches from wall 54: | Temperature ° C. |
|---|---|
| 2 | 780 |
| 4 | 790 |
| 6 | 790 |
| 9 | 785 |
| 12 | 790 |
| 14 | 790 |
| 16 | 810 |

The above table shows that for any point across the mass 13 the average cracking temperature at such point only varied from the mean temperature of 795° C. by ±15° C. and that the average temperature of all points was 791° C.

During a similar cyclic operation, the average mass temperatures were measured and recorded at various distances along the length of mass 13 from face 32. Such measured temperatures are indicated in the following table.

Table 2

| Inches along mass 15 from face 32: | Average mass temperatures, ° C. |
|---|---|
| 6¾ | 910 |
| 20¼ | 750 |
| 40½ | 640 |
| 70⅞ | 450 |
| 104⅝ | 350 |

Although the present invention has been disclosed in connection with a preferred embodiment thereof, I am aware that modifications may be made thereto and therefore such modifications as come within the scope and spirit of the description herein and the claims appended hereinafter are within the contemplation of my invention.

This application is a continuation of Serial No. 598,091, filed July 16, 1956, now abandoned.

I claim:

1. Apparatus for carrying out the thermal conversion of reactive gases comprising: first and second elongated regenerative masses, each having gas conduits disposed parallel to the long axes of said masses lengthwise therethrough, positioned with one end of the first mass adjacent to one end of the second mass with the axes of said masses in non-linear relationship; a walled combustion chamber in flow communication with the conduits of the masses at the adjacent ends of the masses; means for supplying combustion supporting gas to the conduits of the first mass at the end opposite the combustion chamber during a heating cycle; means for supplying reactive gas to the conduits of the second mass at the end opposite the combustion chamber during a conversion cycle; means for withdrawing combustion products from the conduits of said second mass at the end opposite said combustion chamber during said heating cycle; means for withdrawing thermally converted reaction products from the conduits of said first mass at the end opposite said combustion chamber during said conversion cycle; a plurality of straight burners disposed parallel to each other and opening into said combustion chamber opposite said adjacent end of said first mass, the extended axis of at least one burner and at least one conduit of said first mass being in substantially co-axial alignment, said plurality of burners being provided with means for supplying fuel to said burners during said heating cycle; a first baffle having uniformly spaced perforations coinciding with the extended axes of said burners and said gas conduits disposed within said combustion chamber between and spaced from said burners and said first mass and across the end of said first mass; a second baffle having uniformly spaced perforations coinciding with the extended axes of the conduits of said second mass disposed within said combustion chamber across the end of and spaced from said second mass; and an intermediate mixing baffle disposed within said combustion chamber dividing said combustion chamber into a first portion adjacent said first mass, burners opposite said first mass and baffle therebetween on the one hand and a second portion adjacent said second mass and said second baffle on the other hand.

2. Apparatus as claimed in claim 1 wherein a second plurality of straight parallel burners is positioned in flow communication with said combustion chamber opposite said adjacent end of said second mass, the extended axis of at least one burner of said second plurality of burners and at least one conduit of said second mass being in substantially co-axial alignment, said second plurality of burners being provided with means for supplying fuel to said second plurality of burners during a heating cycle for said first mass, said second mass being provided with means for supplying combustion supporting gas to the conduits of said second mass at the end opposite the combustion chamber during a second heating cycle and with means for withdrawing thermally converted reaction products from its conduits at the end opposite said combustion chamber during a second conversion cycle, said first mass being provided with means for withdrawal of combustion products from its conduits at the end opposite said combustion chamber during said second heating cycle and with means for supplying reactive gas to the conduits of said first mass at the end opposite the combustion chamber during a second conversion cycle.

References Cited in the file of this patent

UNITED STATES PATENTS

| 2,422,081 | Cottrell | June 10, 1947 |
| 2,552,277 | Hasche | May 8, 1951 |
| 2,755,321 | Hasche | July 17, 1956 |
| 2,792,437 | Goins et al. | May 14, 1957 |